March 28, 1967 F. L. POST 3,311,897

NEURISTOR ASSOCIATIVE MEMORY

Filed Dec. 20, 1962 2 Sheets-Sheet 1

INVENTOR
FREDERICK L. POST

BY John F. Ostendorf
ATTORNEY

NEURISTOR ASSOCIATIVE MEMORY

Filed Dec. 20, 1962

2 Sheets-Sheet 2

3,311,897

NEURISTOR ASSOCIATIVE MEMORY

Frederick L. Post, Poughkeepsie, N.Y., assignor to International Business Machines Corporation, New York, N.Y., a corporation of New York Filed Dec. 20, 1962, Ser. No. 246,203
8 Claims. (Cl. 340—173)

This invention relates to memory systems and, more particularly, to memory systems of the content addressed or associative type which may employ "active wires" or neuristors as the interconnections as well as the active elements.

It is well-known in the computer art that one of the major problems in using a computer is encountered in the sorting and searching of data. In order to facilitate the handling of data, associative or content addressed memories have been developed. As associative memory may be defined as a memory in which a unit of data, such as a word, is retrieved or stored by specifying part or all of the data content of the word. This is accomplished by supplying input signals to the storage registers of the memory; the signals being representative of some or all of the data to be stored in or retrieved from the storage registers. The input signals are compared with the data stored in the registers to select those registers containing the portion of information upon which the comparison is to be performed. Transferral of the desired data into or out of a memory is then performed according to the operation selected for the memory. Where it is desired to compare certain storage positions with the signals and to exclude others, the excluded storage positions are adapted to be "masked out" of the comparison.

Memory systems of this type have been proposed utilizing cryogenic techniques and magnetic toroid cores. Cryogenic systems place severe environmental limitations on the memory whereas the core memory has the property of making the output signal dependent on the relationship between the stored information and the polarity of the interrogating signal. Moreover, both systems continue to store the data in specific addressable locations even though the location of the data has lost its significance. Thus, they continue to require some measure of direct or location addressing.

Accordingly, it is a general object of the invention to provide an associative or content addressed memory which searches for storing or retrieving data solely on the basis of the content of a word of data rather than its location.

Another object of the invention is to alleviate the problems ordinarily encountered with the use of cryotrons or cores in associative memories by employing new storage, circuit and interconnecting elements.

Digital logic utilizing neuristors as the interconnecting wires as well as the active devices is described by H. D. Crane in a Stanford University Report of July 11, 1960, entitled, "Neuristor Studies," and also in an article entitled, "Neuristor—A Novel Device and System Concept," which appears in the Proceedings of the Institute of Radio Engineers, October 1962. The neuristors or "active wires" are described in conjunction with the fabrication of a computer. Wires are employed in this computer having a very small cross-section and hence a very high resistance such that conventional wiring cannot be employed. The "active wires" differ from conventional wiring in that energy is not propagated through them, but rather a boundary of triggering is propagated.

The neuristors are considered to be analogous to a fuse of the chemical type. If they are considered to be made of a material having the property that the "burned out" portion recovers to potential energy after a brief time, then the line has a region of "live material" along which the trigger is advancing. There is then a region of "dead material" behind the trigger and then a region of "live material" behind that "dead region." Networks employing such wiring and simulating the operation of such devices are described in a Stanford Research Institute report of January 1960 entitled, "Results from Experimental Relay Neuristor Lines," by H. D. Crane and A. Rosengreen. They are also described utilizing tunnel diodes in an article entitled, "An Active Pulse Transmission Line Simulating Nerve Axon," by J. Naguno et al. in the Proceedings of the Institute of Radio Engineers, October 1962. The principles described in these articles relating to neuristors are employed in the associative or content addressed memory of this invention.

Thus, it is another object of the invention to provide an associative memory employing neuristors or "active wires" as the storage and circuit devices as well as the interconnections between the devices.

It is another object of the invention to provide an associative memory employing neuristors and having provision for searching the memory according to a parallel by word and serial by bit operating mode.

A further object of the invention is to provide an associative memory having provision for determining the priority of searching the memory and for changing the priority of the "selected words" during the course of a searching operation.

It is a further object of the invention to provide an associative memory making provision for utilizing the indication provided by a "selected word" for accomplishing the retrieval of data from the word.

In accordance with an aspect of the invention, there is provided an associative or content addressed memory system comprising a plurality of words each of which has a multiple number of bit positions. Each bit position includes means for storing information codified as a binary "1" or binary "0" and manifested as the presence or absence of an electrical signal. Also included in the system are means for establishing a specification of a binary value to store in or retrieve from the storing means, along with means for interrogating the binary content of the storing means. When an indication of the binary content is provided, it may be compared with an established specification and coupled to control the storage or retrieval of the information in that bit position. In like manner, when the information content of a number of bit positions connected in a word configuration corresponds to a word specification, the comparison indication may be employed to store or retrieve the data from the entire word.

A feature of the invention provides for the use of neuristors as the storage and circuit devices as well as the interconnections in each bit position.

Another feature of the invention provides for the words of the memory system to be searched for storage and retrieval in a parallel by word, serial by bit operating mode except that a serial by word priority system is employed when a number of competing "selected words" result from the searching. This enables one and only one "selected word" to have priority of operation at a particular time. Provision is made in the system for assuming priority by a word and for preventing the assumption of it by other words.

A further feature of the invention provides for a storage loop area to receive the indication provided by a "selected word" in response to an interrogation. This indication is stored in the loop until the priority controls permit it to be coupled through appropriate gating means to accomplish the storing and retrieval of the data from the various bit positions in the word.

The foregoing and other objects, features and advantages of the invention will be apparent from the following more particular description of the preferred embodiments of the invention, as illustrated in the accompanying drawings; wherein.

Figure 1:
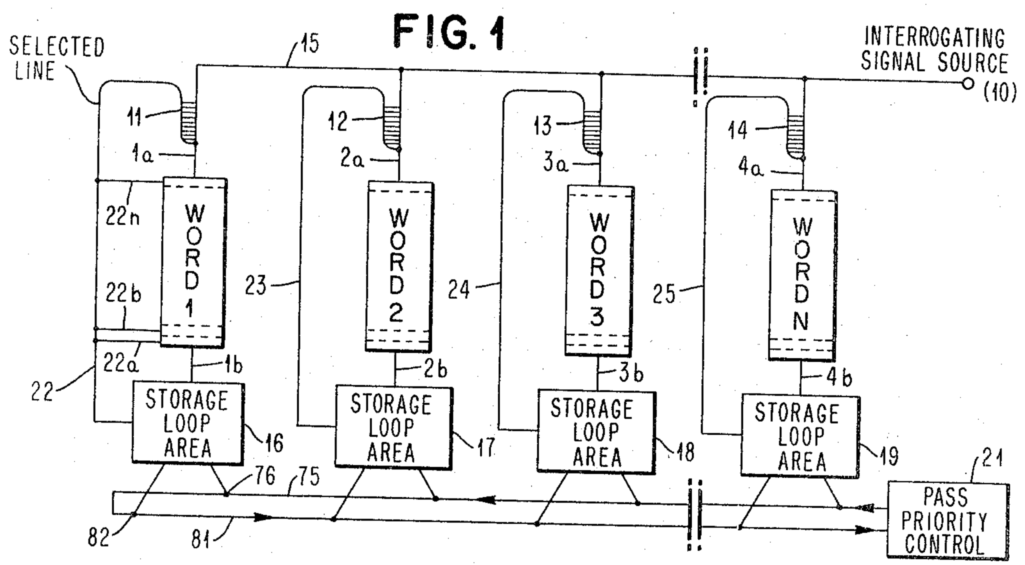
FIGURE 1 is a block diagram of an associative or content addressed memory system embodying the principles of the invention.

As previously stated, neuristors are described with great particularity in the aforecited references as elements capable of being employed as devices and interconnections for performing logical functions in a computer. In addition, certain of these references describe operable relay and tunnel diode simulations for neuristor circuits. Thus, reference should be made to these articles for a complete description of a neuristor.

However, to facilitate the understanding of the invention, a neuristor is defined as an element having a channel with a very small cross-section to permit the propagation of a signal through it. The elements are employed both as devices for switching, gating, etc., purposes as well as "active wires" or "lines" for the propagation of signals in a network of devices. The signals include pulses and waves and have the property of being propagated as discharges through a channel. A refractory period follows the passage of a signal beyond any point in the channel. During this period, that portion of the channel cannot propagate a second signal. The signals propagated through neuristors also have a threshold stimuability and propagate at a uniform velocity and without any attenuation. Signals propagate unless they come to the end of an open line or are inhibited from propagating, as will be discussed more fully hereinafter.

When used in networks, neuristors are formed into devices and interconnected by junctions. Basically, there are two types of junctions, a T junction having a trigger variable and an S junction having an energy variable. A T junction is formed by connecting one line with one or more additional lines. Thus, if a signal is propagated along the first line and it has reached a sufficient threshold, it will be triggered from the junction along the additional lines.

In an S junction, two lines share the same energy storage. Thus, there is no trigger coupling between them, since the triggering of one does not trigger the other. However, there is an energy coupling between the two lines. A discharge propagated through one line produces a refractory period in its own line as well as in the other line of the S junction. Thus, an S junction may be used to inhibit the passage of a signal.

There are two possible modes of operation in an S junction of two lines. Either the pulses approach the junction on a parallel course in the same direction, or, in opposite directions on a collision course. In the former case, if there is a time lag exceeding the refractory period between the two signals, both signals pass through the junction. However, if the time lag is less than this period, then only the first passes and the second is inhibited. If a collision situation occurs, each signal inhibits the other and neither passes the junction.

In view of these properties of a neuristor, they may be employed for triggering or inhibiting in switches or gates. Moreover, they are employed in this invention for the storage of information as well as the means for gaining access to this information. Additionally, it should be understood that neuristors are the preferred elements employed in the memory system of the invention. However, they may be simulated, as described in the cited articles, or, by employing conventional logical circuits. This latter simulation will be more apparent from the description relating to the equivalencies of certain types of logical circuits with certain of the devices used in FIGURES 1–4.

Referring now to FIGURE 1, the principles of the invention are embodied in an associative or content addressed memory system including the WORDS 1, 2, 3 . . . N. Each word is connected from an input line 1a–4a through respective S junctions 11, 12, 13 and 14 to a common interrogating line 15. A source of electrical interrogating signals may be connected at 10 to line 15. Therefore, the lines 1a–4a serve as interrogating signal lines for the WORDS 1, 2 . . . N, respectively.

Each word (as shown by the dashed lines in the WORD blocks) includes a plurality of bit positions organized to be connected to the input lines 1a–4a in serial manner. The interrogating signal lines are connected by output lines 1b–4b to respective storage loop areas 16, 17, 18 and 19. These areas are employed to store an indication of a "selected word" occurring during a search. A feedback connection is provided through the lines 22, 23, 24 and 25 from the loop areas 16–19, respectively, to the S junctions 11–14. In addition, each feedback line, e.g., 22, is connected to each bit position of a word by the lines 22a, 22b . . . 22n.

Each of the storage loop areas 16–19 is also connected to a common pass priority control circuit 21 through a feed line 75 and a return line 81. The operation of the pass priority control circuit will be described more fully hereinafter in conjunction with the memory system.

Figures 2, 3:
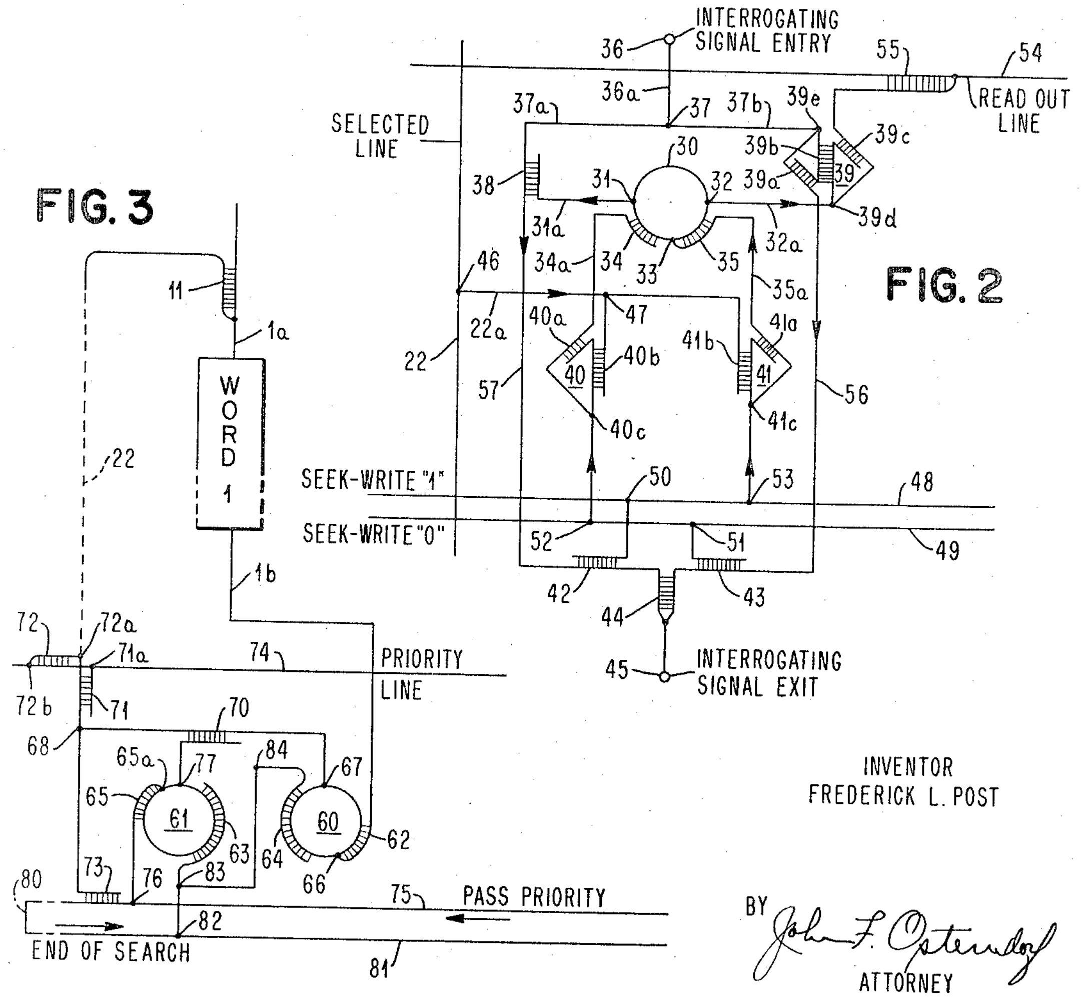
FIGURE 2 is a schematic circuit diagram of the storage and circuit devices for a bit position of the memory system of FIGURE 1.
FIGURE 3 is a schematic circuit diagram of the storage loop area associated with each word of the memory system of FIGURE 1.

Referring to FIGURE 2, the circuit for the storage of information comprises a loop 30 arranged in a circular fashion to propagate a signal in a unidirectional manner. For purposes of this description, it is assumed that any signal present in the loop propagates in a clockwise direction. The loop 30 is connected to the remainder of the bit position or cell circuitry by a plurality of T junctions 31, 32, 33. In addition, portions of the loop 30 form S junctions at 34 and 35. The cell includes an entry terminal 36 to receive an interrogating signal and an exit terminal for the signal at 45. The cell also comprises a plurality of T junctions and an S junction 38, a gate 39, including the S junctions 39a, 39b and 39c, gates 40 and 41, including the S junctions 40a, 40b and 41a, 41b, respectively, and S junctions 42, 43 and 44.

The cell for each bit position has seek-write lines for a binary "1" and binary "0" 48, 49 connected to it for establishing a particular specification of binary cell content to be searched for storing or retrieval. Lines 48, 49 are connected into the cell at the gates 42, 43 through the T junctions 50, 51, respectively, and to the gates 40, 41 through the T junctions 52, 53, respectively. An information retrieval or read-out line 54 is connected to the cell at the gate 39 through an S junction 55. In each instance, corresponding bit positions of each word are connected to the seek-write lines and the read-out line. In addition, the feedback line ("selected line"), e.g., 22, is connected into the cell through the T junctions at 46 and 47, the wire 22a and the S junctions 40b and 41b.

In operation, if it is assumed that a binary "1" is stored in the loop 30 and a specification seeking a binary "1" is established on line 48, the searching operation commences with the entrance of an interrogating signal at 36. The signal propagates through the line 36a to the T junction at 37. Signals are triggered on the lines 37a and 37b and propagate to the S junction 38 and the gate 39, respectively.

Concurrently, each time that the signal indicative of the stored information in the loop 30 passes the T junctions 31 and 32, a signal is triggered and propagates along the lines 31*a* and 32*a* toward the S junction 38 and the gate 39, respectively. Thus, the signal travelling through the line 37*a* encounters the pulse travelling on the line 31*a* at the S junction 38 on a collision course. As already stated, collision operation at an S junction results in the inhibiting of both signals so that neither signal passes beyond the S junction 38. If there was no signal present on line 37*a*, the signal present on line 31*a* disappears at its open end.

However, the signal propagating along the line 32*a* to gate 39 triggers additional signals at a T junction 39*d*. This signal travels toward the S junctions 39*b* and 39*c*. Similarly, the signal propagating along the line 37*b* triggers signals at the T junction 39*e*. These signals travel toward the S junctions 39*a* and 39*b*. The two signals at the S junction 39*b* inhibit each other so that neither passes permitting the signals to pass through the S junctions at 39*a* and 39*c*. A signal is provided to the S junction 55 and therefore to the read-out line 54. The provision of this signal on line 54 is a by-product of the interrogation. It should not be considered as the indication of particular retrieval information. The retrieval of the information is described more fully hereinafter. Concurrently, a signal is provided on the line 56 indicating that a binary "1" is stored in the loop 30. No signal is provided on the wire 57 indicating that a binary "0" is stored in the loop 30.

Thus far in the operation of the storage circuitry, interrogation of the loop has taken place and it has been determined that a binary "1" is stored in loop 30. Comparison of this indication has not occurred with an established specification. The presence of a signal on line 48 indicates that a binary "1" is sought for comparison purposes. The signal on 48 triggers T junctions 50 and 53 providing signals to the S junction at 42 and to the gate at 41. There is no signal provided to S junction 43, and, therefore, the signal on line 56 is propagated through junction 44 and appears at exit terminal 45. A signal at 45 indicates that the data stored in the cell is the same as the data sought in the search.

The effect of a signal at the S junction 42 from T junction 50 is to block any signal propagating along the line 57. Thus, if a binary "0" had been stored in the loop 30 and a binary "1" was sought for comparison, a signal would have been provided on the line 57. This signal would have been blocked by S junction 42 from proceeding to the interrogating signal exit terminal at 45. The lack of a signal at 45 indicates that no comparison has been realized and that the data in the cell is not the same as the data sought. However, if the established specification sought is a binary "0" and a binary "1" is present in the loop 30, then the S junction 43 is activated from the signal triggered at T junction 51 to inhibit any signal from passing from the line 56 to the terminal 45. In similar manner, it is obvious that the junctions operate to permit the appearance of a signal at the terminal 45, if and only if a binary "0" is stored in the loop 30 and a binary "0" is sought for comparison purposes. Thus, a signal is provided at terminal 45 if the information stored in the loop 30 corresponds to the information sought in the specification.

The signal propagated at T junction 53 for gate 41 triggers additional signals at the T junction 41*c*. One of these signals passes through the S junction at 41*b* if there is an absence of a signal provided from the T junctions 46 and 47. The signal passed by junction 41*b* blocks any further passage of the second signal triggered from the T junction 41*c* at the S junction 41*a*. Thus, data cannot be stored in loop 30 unless a signal is provided from "selected line" 22 to T junctions 46 and 47.

In order to store or write information in loop 30, either one of the lines 48, 49 is activated with a signal. If it is assumed that the line 49 is activated to write a binary "0" in the loop 30, a signal is generated at the T junction 52 which is propagated to the T junction 40*c* of the gate 40. Assuming that a signal is propagating on the line 22 (the manner in which this signal is triggered will be more apparent from the description which follows hereinafter), a gating signal appears at the T junctions 46 and 47 which is coupled to the S junction 40*b*. The occurrence of this signal permits a "0" signal to propagate through the S junction 40*a* and line 34*a* to the S junction at 34. If a signal is propagating in the loop 30, the appearance of a signal at the S junction 34 results in a collision between the two signals. The passage of a signal is inhibited in the loop 30 and a binary "0" is stored.

Correspondingly, if the line 48 is activated, a signal is generated at the T junction 53. This signal propagates through the gate 41 and line 35*a* to the S junction 35 in the same manner as described for the gate 40. If the loop 30 has a signal propagating through it, then the appearance of a signal in the S junction 35 does not affect the signal stored. However, if there is no signal propagating in the loop 30 then T junction 33 triggers a signal for storage in loop 30. Thus, a binary "1" would be written in the storage circuitry.

The storage circuitry has been described thus far as using neuristors as the devices and interconnections. However, equivalent storage circuitry can be employed utilizing conventional wiring and diode and transistor logical circuits. Thus, the functions performed by certain of the junctions and gates have been equated with conventional logical blocks in FIGURES 5-9.

Figures 4, 5, 6, 7, 8, 9:
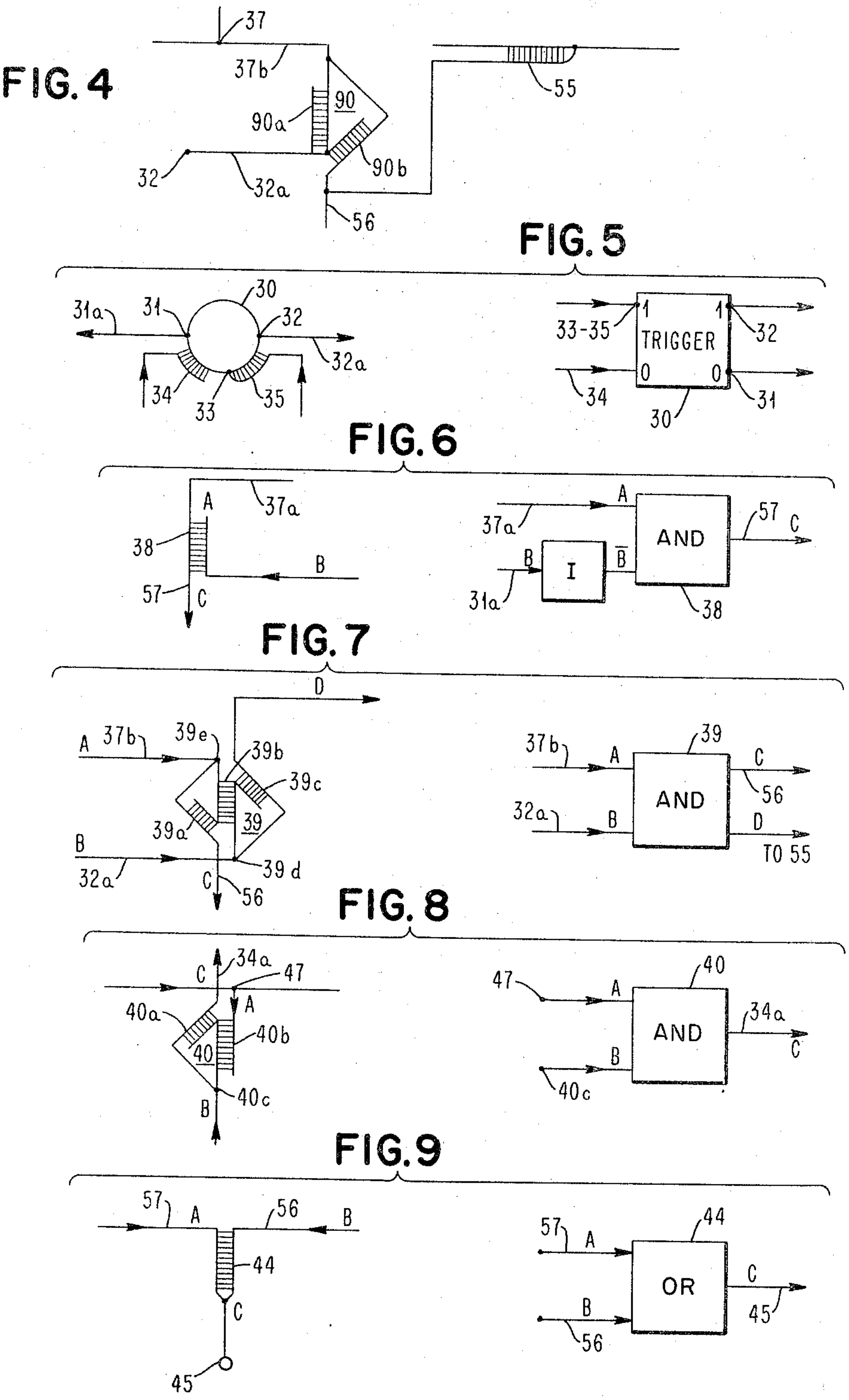
FIGURE 4 is a schematic circuit illustrating an alternate gating circuit which may be utilized in the circuit of FIGURE 2; and, FIGURES 5–9 are circuit diagrams showing the equivalency of conventional logical circuits with certain of the storage and circuit devices employed in the circuits of FIGURES 1–4.

In FIGURE 5, a storage loop 30 is equated with a trigger circuit having inputs at 34 and 33, 35 and outputs at 31 and 32. Similarly, S junction 38 and gates 39, 40 have been equated with AND circuits in FIGURES 6–8, and the junction 44 is shown as equivalent to an OR circuit in FIGURE 9. Junction 38 provides an output on line 57 only if signal B is not present. Therefore, the Invert block is included in the equivalent circuit. Gates 39 performs a dual AND function since it provides two output signals C and D in response to the two input signals A and B. OR gate 44 permits either signal A or B to pass to terminal 45. In addition, it prevents a signal on one line from being propagated in a reverse direction on the other line. It is readily apparent that this function can be performed if conventional unidirectional conducting devices are employed.

Referring again to FIGURE 1, interrogation of each WORD 1–N preferably occurs in a parallel manner. An interrogating signal from source 10 is supplied simultaneously to each word input line 1*a*–4*a*. Thereafter, each bit position of each word is interrogated in a serial sequence only if each succeeding bit position corresponds to the specification established for the search. Thus, the interrogating signal provided at exit terminal 45 for one bit position is propagated to the entry terminal 36 for the next succeeding bit position. If each bit position has data stored in it corresponding to the data established in the search specification, then the interrogating signal appears at the corresponding output lines 1*b*–4*b*. This signal is propagated to the respective storage loop area 16–19 indicated that the particular word has been "selected."

Referring now to FIGURE 3, an indication provided by WORD 1 is propagated to the storage loop area including the loops 60 and 61. Also included are the S junctions 62, 63, 64, 65, 70, 71, 72 and 73. The indication that the word is "selected" is propagated through the S junction 62 to the T junction 66. Junction 66 triggers a signal which propagates in loop 60 in the same manner as described for loop 30. (As previously described with respect to loop 30, propagation of a signal in loops 60 and 61 is assumed to take place in a clockwise direction.) As long as a signal is present in the loop 60, it it indicates that the particular word has been "selected." Selection for storage or retrieval of information is accomplished through the T junction 67 which is triggered by the signal in loop 60. If it is assumed that the S junctions at 70, 71 and 72 are deactivated (that is, they are not inhibiting the passage of a signal), then a signal which may be a pulse train is propagated from loop 60 through the "selected line" 22 to the S junction 11. Concurrently, a signal is provided through the lines 22a, 22b, 22n to each of the bit positions in the WORD 1. The signal appearing at the S junction 11 is coupled into the word through 1a as an interrogating signal. This signal propagates through the word permitting the retrieval or read-out of data from each bit position of the "selected word" to take place.

The retrieval of data from the loop 30 of each bit position depends on the operation of the gate 39. As already described, a signal at 36 (refer to FIGURE 2) propagates through lines 36a, 37a and 37b to S junction 38 and gate 39. If a binary "1" is stored in the loop 30, S junction 38 acts as an inhibitor and gate 39 performs a dual AND function to provide signals on line 56 and to S junction 55. From junction 55 a signal is triggered in line 54 indicating that a binary "1" is stored in this bit position. The signal on line 56 is propagated to the next bit position as an interrogating signal.

If a binary "0" is stored in loop 30, then S junction 38 passes the interrogating signal for the next bit position. Gate 39 does not provide any output signals, and, therefore, no signal is propagated on line 54. This operation continues through each bit position of the selected word permitting read-out of the stored data to take place in a sequential manner.

Searching of the contents of each selected word storage loop area occurs on a priority basis. Accordingly, circuitry is provided in the invention for controlling the sequencing of priority from one storage word loop area to the next. Circuitry is also included for assuming priority for a particular selected word storage loop area and for preventing the assumption of priority by any other area. The description of the priority or sequencing control circuit has been made on the basis of priority being assumed by the storage loop areas in a right-to-left manner. However, it is to be understood that the choices of right and left are purely arbitrary, and priority could also be exercised in a left-to-right manner.

Referring again to FIGURE 3, priority line 74 is provided through each of the selected word storage loop areas for propagating signals to control the assumption of priority. The S junctions 71 and 72 of each selected word storage loop area are associated with the "selected line" 22 and the priority line 74. Priority is assumed for a "selected word" when a signal is triggered at 67 from loop 60. It propagates through junction 70 to T junction 68 where additional signals are triggered. One of these signals propagates through line 22 to T junction 72a. A signal is triggered at this T junction for S junction 72 and a further signal is triggered at T junction 72b for line 24. This latter signal is propagated to all of the storage loop areas located to its left. At each of these loop areas a signal is triggered at T junction 71a for S junction 71 to inhibit the passage of any signal from 68. Thus, the rightmost loop area assumes priority of operation and prevents the assumption of priority by any other loop area thereby permitting searching of each "selected word" to be accomplished in a serial manner.

As previously stated, the pass priority control circuit 21 is connected to each storage loop through the feed line 75 and the return line 81. In order to pass priority from one storage loop area to the next, a signal is propagated on line 75 and is coupled into storage loop 61 through T junctions 76 and 65a and S junction 65. This signal triggers a signal at T junction 77 which is propagated to S junction 70 to inhibit the passage of any signals from loop 60 to line 22. In this manner, priority is released from this loop area at 72 permitting it to be assumed by the next storage loop area to the left having a selected word indication stored in its loop 60. Also, the presence of a signal in loop 61 provides an indication that the word has been searched for the storage and retrieval of the information.

An S junction 73 is also provided for each selected word storage loop area for use with the pass priority control circuit 21. This junction acts to prevent a pass priority or sequencing signal to be rippled through the entire memory system when the first pass priority signal is propagated on line 75. Junction 73 is activated from T junction 68 when a signal is propagating from loop 60. After the particular selected word storage loop area is searched, the S junction 73 is deactivated by inhibiting of the signal from 60 at S junction 70 permitting the next pass priority signal to propagate to the next selected word storage loop area.

After each word has been searched and the pass priority pulses have come to the closed loop connection at 80, they are coupled back through the connection 81. In this manner, they may be employed to reset or clear each of the selected word storage loops indicating the end of the search. To illustrate, the returning signal generates signals at the T junctions 82, 83, 84. The signals from T junctions 83 and 84 are propagated through the S junctions 64 and 63, respectively, to clear any information stored in the loops 61 and 60, respectively. The clear circuit is arranged to permit both loops 60 and 61 to be cleared simultaneously or to permit loop 60 to be cleared before loop 61 thereby preventing any additional searching signals to be propagated to line 22.

As shown in FIGURE 2, the gate 39 employed for passing interrogating pulses with a binary "1" is stored in the loop 30 as well as to pass pulses to the S junction 55 during the data retrieval operation includes a multiple number of S junctions 39a–39c. An alternate embodiment for this gate is shown in FIGURE 4. A gate 90 is provided utilizing two S junctions 90a and 90b. Thus, a pulse provided along the line 37b is passed through the S junction 90b only if a pulse is provided on the line 32a for the S junction 90a. This same signal is coupled to the S junction 55 after it passes through the S junction 90b.

Although the operation of the memory has been described with each bit position of each word being interrogated and compared against a particular specification of binary content, it is apparent that the operation of the memory system can also take place if the bit positions in a particular word are "masked out." Thus, if neither a binary "1" or a binary "0" is specified for the search, then the interrogating signal propagates through the cell regardless of the binary content of the particular bit positions. This aspect of operation occurs since the S junction 38 and the gate 39 both pass signals and the S junctions at 42 and 43 are deactivated and, therefore, do not impede the passage of any signal. The S junction at 44 acts only to prevent coupling back from one line into the other line and permits either one to pass a pulse to the interrogating signal exit of a bit position. Consequently, the search specification can be established such that one bit position can be masked and the next searched or several searched and several masked in that order or any combination of both of them.

As a corollary to this mode of searching, the operation of searching could have been made serial by word and serial by bit. Similarly, the priority system could have been made to operate in a serial-parallel manner, so that the bits that were not specified in the search could have been bypassed thereby eliminating them from the search. In addition, the initial interrogating pulse could be introduced with some degree of frequency or staggering into succeeding words. Thus, this memory system enables a number of known unique words to be searched while permitting a large number of bit positions to be simultaneously searched. It operates solely in an associative or content addressed manner permitting storage space to be made available as needed.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for storing information codified as a binary value, comprising
   means for storing the information,
   means for establishing a search specification of a binary value to store in or retrieve from the storing means,
   means for interrogating the binary content of the storing means providing an indication thereof,
   means for comparing the indication with the specification, and
   means responsive to the comparison and including feedback means coupled to the interrogating means and the storing means for providing the control to effect the storage or retrieval of information in the storing means.

2. The circuit of claim 1, wherein the interrogating means comprises
   receiving means for accepting an interrogating signal and the control from the feedback means, as an interrogating signal,
   gating means coupled to the storing means and to the receiving means and responsive to the binary content of the storing means to pass an interrogating signal indicative of said binary content, and
   means for coupling said gating means to the comparing means.

3. The circuit of claim 2, wherein the comparing means comprisese signal passing means coupled to the interrogating means and responsive to the means for establishing the search specification of a binary value to indicate a correspondence in the comparison by passing a signal.

4. The circuit of claim 3, wherein the means responsive to the comparison includes gating means responsive to the signal passed indicating a correspondence and to the means for establishing a specification to provide the control to the feedback means to write information having a binary value into the storing means.

5. A register for storing a plurality of bits of information organized in a word, comprising
   a plurality of storage circuits, each circuit storing a bit of information,
   each of said circuits having an input and an output and all connected except the first and last so that the input of one circuit is connected to the output of the preceding circuit, the input of the first circuit being connected to accept an interrogating signal,
   means connected to said circuits for establishing a specification of a binary value to store in or retrieve from the storage circuits, so that an indication is provided at the output of the last storage circuit in response to the interrogating signal if the binary content of each bit position corresponds to the established specification, and
   means responsive to the indication including feedback means for propagating the indication to the first storage circuit of the register as an interrogating signal to accomplish the retrieval of information.

6. A register for storing a plurality of bits of information organized in a word, comprising
   a plurality of storage circuits, each circuit storing a bit of information,
   each of said circuits having an input and an output and all connected except the first and last so that the input of one circuit is connected to the output of the preceding circuit, the input of the first circuit being connected to accept an interrogating signal, means connected to said circuits for establishing a specification of a binary value to store in or retrieve from the storage circuits, so that an indication is provided at the output of the last storage circuit in response to the interrogating signal if the binary content of each bit position corresponds to the established specification, and
   means responsive to the indication including feedback means for propagating the indication to each storage circuit as a gating signal to accomplish the storage of information in said storage circuits according to the established specification.

7. A memory system, comprising
   a plurality of registers each of which stores a plurality of bits of information organized in a word,
   each of said registers including a plurality of storage circuits for storing individual bits of information,
   each of said circuits in each register having an input and an output and all connected except the first and last so that the input of one circuit is connected to the output of the preceding circuit, the input of the first circuit of each register being connected to accept an interrogating signal,
   means connected to said circuits for establishing a search specification of a binary value to store in or retrieve from the storage circuits, so that an indication is provided at the output of the last storage circuit of each register in response to the interrogating signal if the binary content of each bit position corresponds to the established specification, and
   means responsive to the indication for accomplishing the storage and retrieval of the information from at least some of the storage circuits in each register, said last named means including storage means coupled to each register for receiving the indication and storing it, individual feedback means coupled to the indication receiving means and to the input of the first storage circuit in each register and to each of the storage circuits in each register and circuitry for controlling the storage and retrieval of information from the registers by propagating the stored indication through the individual feedback means according to a particular order.

8. The memory system of claim 7, wherein the control circuitry for accomplishing the storage and retrieval of information includes circuitry for responding to the presence of an indication of a selected word to assume priority of search for that word by propagating the stored indication through the feedback means for that word and to prevent the assumption of priority by any other selected word by inhibiting the propagation of the stored indication through the feedback means for all other selected words, and circuitry for controlling the passage of priority in response to a pass priority signal after searching for a word has been terminated.

References Cited by the Examiner

UNITED STATES PATENTS

| | | | |
|---|---|---|---|
| 3,185,965 | 5/1965 | Lee | 340—172.5 |
| 3,191,012 | 6/1965 | Fleischer et al. | 340—173.1 X |
| 3,235,839 | 2/1966 | Rosenberg | 340—173.1 X |
| 3,238,504 | 3/1966 | Crane | 340—172.5 |

OTHER REFERENCES

Newhouse, V. L., and Fruin, R. E.: "A Cryogenic Data Addressed Memory," Proc. AFIPS Spring Joint Computer Conference, May 1–3, 1962, pp. 89–99.

BERNARD KONICK, *Primary Examiner.*

J. BREIMAYER, *Assistant Examiner.*